March 17, 1936. J. J. KEYSER 2,034,581
DRIVING MECHANISM FOR FLIER, SPINNING, AND DOUBLING
FRAMES, WITH SPINDLES DRIVEN BY GEAR WHEELS
Filed June 29, 1935 2 Sheets-Sheet 1

Inventor:
Johann Jacob Keyser

By Munn & Co.
Attorneys

March 17, 1936.                J. J. KEYSER                2,034,581
            DRIVING MECHANISM FOR FLIER, SPINNING, AND DOUBLING
              FRAMES, WITH SPINDLES DRIVEN BY GEAR WHEELS
                    Filed June 29, 1935        2 Sheets-Sheet 2

Inventor:
Johann Jacob Keyser

By Munn & Co.
Attorneys

Patented Mar. 17, 1936

2,034,581

UNITED STATES PATENT OFFICE 2,034,581

DRIVING MECHANISM FOR FLIER, SPINNING, AND DOUBLING FRAMES, WITH SPINDLES DRIVEN BY GEAR WHEELS

Johann Jacob Keyser, Aarau, Switzerland

Application June 29, 1935, Serial No. 29,108
In Germany July 15, 1933

5 Claims. (Cl. 118—41)

My invention relates to an improvement of my driving mechanism for flier, spinning and doubling frames by means of gear wheels as described in my Patent No. 1,963,135, according to which the spindle driving shaft extending along the whole length of the frame, and also the drawing and delivery mechanism and also the lifting and lowering device for the ring or spindle frame are driven by means of a vertical shaft mounted in the end or principal shield or cowl.

According to my Patent No. 1,963,135 the said vertical shaft is seated nondisplaceably at its upper extremity and the driving mechanism for the rising and lowering spindle frame slides together with its driving wheel up and down on the vertical shaft. As the whole of the mechanism is however for its successful working dependent upon a very reliable and careful lubrication there occur on the vertical shaft during the up and down motion of the mechanism, very considerable extrusion and accumulation of lubricant, which get soiled and mixed with the dust from spinning, and by this clogging up of the dust and lubricant mixture the movement of the vertical shaft or spindle is deleteriously affected. To this must be added the fact, that the speed change gear at the top extremity of the vertical shaft only provides one change of speed during the stop, and that the mechanism for driving the drawing and delivery mechanism had to be penetrated by the vertical shaft, a fact which also contributed to a heavy extrusion of the lubricant. A further defect resides in the fact, that when the direction of rotation of the spindles is reversed, the direction of rotation of the vertical shaft and of the motor also had to be reversed, thereby also causing a reversal of the direction of rotation of the drawing and delivering mechanism.

My present invention eliminates all these defects by reason of the fact, that a hollow vertical shaft, rotatably mounted in stationary fixed bearings is provided for driving the drawing and delivery mechanism and also a solid shaft axially displaceable in the said hollow shaft, and supported in a bearing of the up and down moving spindle frame, is provided for actuating the spindle driving shaft and the raising and lowering device for the spindle frame.

This particular arrangement has that advantage, that the solid vertical shaft no longer comes into contact with the lubricant of the change gear, the spindle frame driving mechanism nor the driving mechanism for the drawing mechanism, and therefore the vertical solid shaft can no longer extrude the lubricant. Moreover a bulging and bending of the vertical shaft is almost absolutely eliminated by the fact, that a certain play of movement between the change gear and the vertical solid shaft is created and allowed.

The appended drawings illustrate an embodiment of the invention by way of example, Figure 1 showing a front view of the main shield of a spinning frame according to the invention.

Figure 2 showing a vertical section through the change gear, and

Figure 3 a front view of the change gear, whereas

Figure 1:
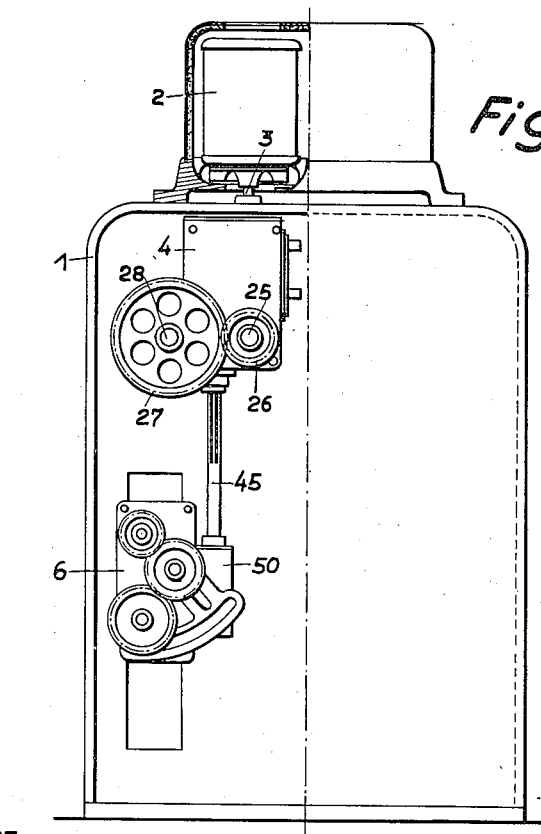
Figures 4, 5:
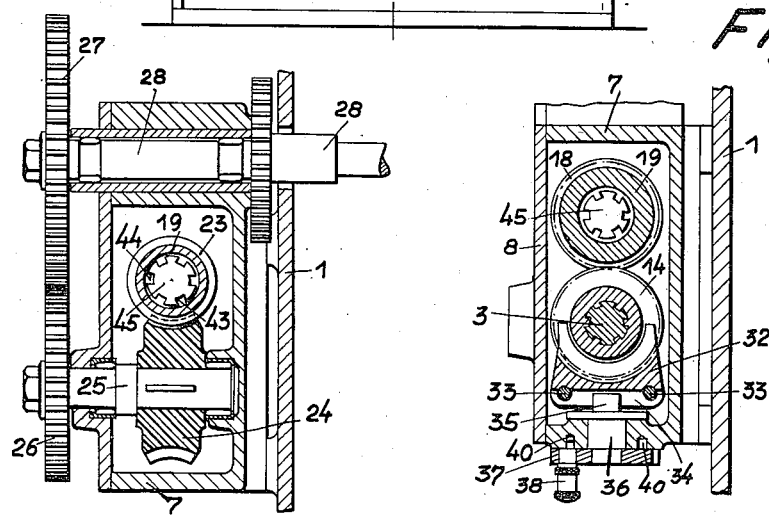
Figure 4 shows a section of Figure 2 along the line 4—4 thereof; whilst
Figure 5 represents a section according to line 5—5 of Figure 2.
Figure 3:
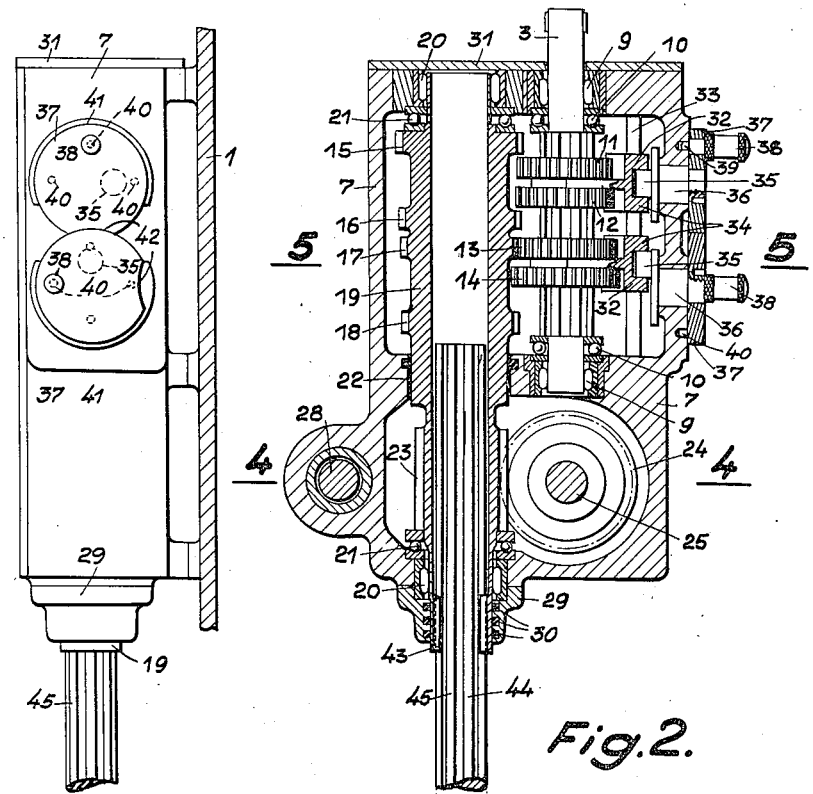

The vertical motor 2 for driving the frame is mounted on the main end shield 1 of the flier, spinning or doubling frame. The motor 2 drives a change gear 4 by means of the shaft 3, the said change gear driving at the same time also the change wheels 26 and 27 of the drawing and delivery mechanism. A vertical shaft 45 passes from the gear box 4 to the driving mechanism 6 of the speed or flier frame, the said mechanism also containing the mechanism for raising and lowering the speed frame.

The speed change gear consists according to Figures 2–5 of the housing 7 which is bolted to the main end shield and is closed at the front by means of a cover plate 8. The vertical motor driven shaft 3 driven by motor 2 is mounted in roller bearings 9 provided in the housing 7, the axial thrust of this vertical driving shaft is taken up by a suitable thrust bearing 10. Two groups of gear wheels 11, 12 and 13, 14 are nonrotatably but slidably mounted on the middle part of the shaft 3 which is there provided with feathers. The said two groups of gear wheels are adapted to mesh with toothed crowns 15, 16, 17 and 18. The toothed crowns 15—18, are mounted on a hollow shaft 19 also running in two roller bearings 20, the axial thrust of said hollow shaft 19 being taken up by a thrust bearing 21, this hollow shaft 19 passes through a middle wall 22 in the housing 7 and is provided at its lower extremity with a worm 23 which meshes with a worm gear wheel 24, the shaft 25 of which drives by means of the change wheels 26 and 27 the main driving shaft 28 of the draft and delivery mechanism. The hollow shaft 19 passes at its lower extremity through the lower wall of the housing 7 being there sealed off and made oil tight by means of a cap 29 and the packing or sealing rings 30. The bearings 9 and 20 are covered at the top by means of a plate 31. The gear wheel groups 11, 12 and 13, 14 can each be shifted axially by means of a forked member 32, which is adapted to slide on the bars 33 parallel to the shaft 3. Each forked member is provided with a horizontal groove 34 into which a crank pin 35 of a shaft 36 is adapted to engage. On each of the outer extremities of the shafts 36 a disc 37 is mounted which carries a handle 38 provided with a snap pin 39 which can snap into three different openings 40 of the sliding surface 41. The discs 37 have a somewhat larger diameter than the distance between the shafts 36. Each of these discs 37 is provided with a circular excision 42 into which the adjacent disc is free to enter. Therefore each of the discs 37 can only rotate, when the excision or recess 42 of the other disc 37 is in position opposite it.

The hollow shaft 19 is provided at its lower extremity with a number of feathers 43 which engage into grooves 44 provided on the vertical shaft 45. At its top the hollow shaft 19 is bored out to such a size, that the shaft 45 is free to slide freely and with considerable play, up and down in it. The vertical shaft 45 has two bevel gear wheels 46 and 47 mounted on it at its lower extremity, and runs in roller bearings 48 mounted in a hollow member 49 which can be displaced in the housing extension 50. The bevel gear wheels 46 and 47 may also when required be caused to mesh with a bevel gear wheel 51 which drives the driving shaft of the spindles by means of the shaft 52.

Figure 2:
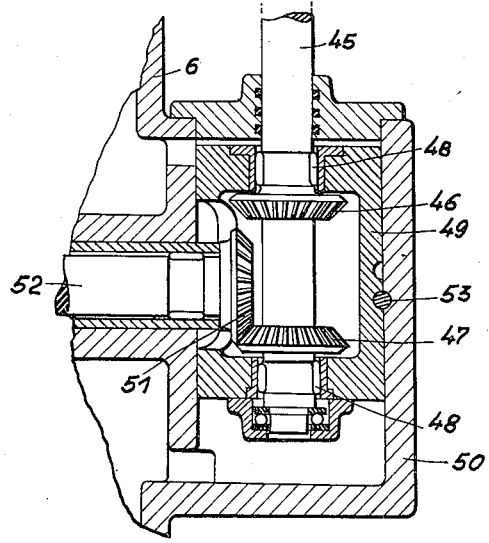

The hollow or box type member 49 encloses the bevel gear wheels 46 and 47 in such a manner that it can, after the locking bolt or pin 53 has been withdrawn, be displaced by displacing the shaft 45, in order that either the bevel gear wheel 46 or 47 may be caused to mesh with the bevel gear wheel 51. After the adjustment has been made the locking pin is reinserted, thereby enabling the shaft 45 again to follow all the movements of the mechanism connected to the speed frame. The driving mechanism works as follows:—viz:

In the case illustrated in Figure 2, the wheel 13 meshes with the toothed crown 17. By rotating the lower disc 37 by 180° the gear wheel 14 will be caused to mesh with the toothed crown 18. When the lower disc is in its middle position and the crank pin is in the horizontal position, the two gear wheels 13 and 14 are out of mesh, and the excision 42 of the lower disc is opposite to the upper disc 37. The latter can now as desired be turned around 90° either to the right or left, in order to cause the gear wheels 11 or 12 to mesh with the toothed crowns 15 or 16. In the middle position both the gear wheels 11 and 12 are out of mesh with their respective toothed crowns. The gear ratio or transmission ratio between the gear wheels 11, 12, 13, 14 and 15, 16, 17, 18 is different, thus enabling four different speeds to be obtained from the gear-mechanism. The motor is preferably of a type having three or more adjustable speeds, in order to enable the speed of rotation of the spindles and consequently also the speed of all the driving mechanisms depending on it to be simultaneously changed.

All that is necessary, in order to change the direction of rotation of the spindles, is to displace the shaft 45 and its gear wheels 46 and 47 in the housing 6. All the parts continue to rotate in the same direction, only the spindles having changed the direction of rotation, thus the driving arrangements are very much simplified and made more reliable.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. In a driving mechanism for flier, spinning and thread machines in which spindles are arranged in a spindle beam that can be raised or lowered, a gear casing carried by the spindle beam, a vertical shaft having one end rotatably mounted in the casing and movable longitudinally with the beam and casing, a gearing within the casing and driven by the shaft for causing rotation of the usual spindle operating shaft and raising and lowering of the spindle beam, a box having differential gearing therein, a hollow shaft mounted for rotation in the box and held against longitudinal displacement, the vertical shaft having the upper end slidably keyed within the hollow shaft, operative connections between the differential gearing and the hollow shaft.

2. In a driving mechanism for flier, spinning and thread machines in which spindles are arranged in a spindle beam that can be raised or lowered, a gear casing carried by the spindle beam, a vertical shaft having one end rotatably mounted in the casing and movable longitudinally with the beam and casing, a gearing within the casing and driven by the shaft for causing rotation of the usual spindle operating shaft and raising and lowering of the spindle beam, a box having differential gearing therein, a hollow shaft mounted for rotation in the box and held against longitudinal displacement, the vertical shaft having the upper end slidably keyed within the hollow shaft, operative connections between the differential gearing and the hollow shaft, the gearing in the casing including means for changing the direction of rotation of the spindles.

3. In a driving mechanism for flier, spinning and thread machines in which spindles are arranged in a spindle beam that can be raised or lowered, a gear casing carried by the spindle beam, a vertical shaft having one end rotatably mounted in the casing and movable longitudinally with the beam and casing, a gearing within the casing and driven by the shaft for causing rotation of the usual spindle operating shaft and raising and lowering of the spindle beam, a box having differential gearing therein, a hollow shaft mounted for rotation in the box and held against longitudinal displacement, a vertical shaft having the upper end slidably keyed within the hollow shaft, operative connections between the differential gearing and the hollow shaft, the differential gearing in the box including gears formed on the hollow shaft for creating different speeds.

4. In a driving mechanism for flier, spinning and thread machines in which spindles are arranged in a spindle beam that can be raised or lowered, a gear casing carried by the spindle beam, a vertical shaft having one end rotatably mounted in the casing and movable longitudinally with the beam and casing, a gearing within the casing and driven by the shaft for causing rotation of the usual spindle operating shaft and raising and lowering of the spindle beam, a box having differential gearing therein, a hollow shaft mounted for rotation in the box and held against longitudinal displacement, the vertical shaft having the upper end slidably keyed within the hollow shaft, operative connections between the differential gearing and the hollow shaft, a shaft for operating the stretching and supplying mechanism, a worm gear for operating the shaft, and a worm on the hollow shaft meshing with the worm gear.

5. In a driving mechanism for flier, spinning and thread machines in which spindles are arranged in a spindle beam that can be raised or lowered, a gear casing carried by the spindle beam, a vertical shaft having one end rotatably mounted in the casing and movable longitudinally with the beam and casing, a gearing within the casing and driven by the shaft for causing rotation of the usual spindle operating shaft and raising and lowering of the spindle beam, a box having differential gearing therein, a hollow shaft mounted for rotation in the box and held against longitudinal displacement, the vertical shaft having the upper end slidably keyed within the hollow shaft, operative connections between the differential gearing and the hollow shaft, a motor, a shaft driven by the motor, said shaft driving a plurality of displacement gears of the differential in the box.

JOHANN JACOB KEYSER.